(12) United States Patent
Dominguez

(10) Patent No.: US 11,399,511 B2
(45) Date of Patent: Aug. 2, 2022

(54) CONVERTIBLE PET HARNESS

(71) Applicant: Ethel Dominguez, Miami Beach, FL (US)

(72) Inventor: Ethel Dominguez, Miami Beach, FL (US)

(*) Notice: Subject to any disclaimer, the term of this patent is extended or adjusted under 35 U.S.C. 154(b) by 146 days.

(21) Appl. No.: 17/033,490

(22) Filed: Sep. 25, 2020

(65) Prior Publication Data

US 2022/0095587 A1    Mar. 31, 2022

(51) Int. Cl.
*A01K 27/00*        (2006.01)

(52) U.S. Cl.
CPC .......... *A01K 27/002* (2013.01); *A01K 27/001* (2013.01)

(58) Field of Classification Search
CPC ..... A01K 27/002; A01K 27/00; A01K 27/001
See application file for complete search history.

(56) References Cited

U.S. PATENT DOCUMENTS

| | | | | |
|---|---|---|---|---|
| 1,906,043 | A * | 4/1933 | Bernstein | A01K 27/002 |
| | | | | 119/856 |
| 4,896,630 | A * | 1/1990 | Luce | A01K 27/002 |
| | | | | 119/771 |
| 2002/0092138 | A1* | 7/2002 | Spiller | A44B 18/00 |
| | | | | 24/306 |
| 2008/0047501 | A1* | 2/2008 | Madere | A01K 27/002 |
| | | | | 119/856 |

FOREIGN PATENT DOCUMENTS

EP        3613283 A1 *  2/2020

* cited by examiner

*Primary Examiner* — Kristen C Hayes

(74) *Attorney, Agent, or Firm* — Christopher J. Vandam, PA; Chris Van Dam

(57) ABSTRACT

A training harness for a pet with a neck loop 16 placed over the neck of the pet. An upper connector 42 lays on the back of the pet with a lower connector 54 lying along the underside of the pet. A convertible strap 12 encircles the chest of the pet behind the front legs and connects with buckles to the upper connector strap 42. The left buckle of the upper connector is opposite to and mates with the left buckle of the convertible strap. The right buckle on the upper connector is opposite to and mates with the right buckle on the convertible strap. This allows the convertible strap 12 to be removed from the lower connector 54 and used apart from the balance of the device as a traditional collar with mating connectors at each end of the convertible strap 12. Multiple connection points are provided for attaching a leash for different training styles.

5 Claims, 5 Drawing Sheets

CONVERTIBLE PET HARNESS

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to pet training harnesses, and more particularly, to a pet harness that converts from a training harness with leash connector rings above or below the neck to a more traditional style collar for walking.

2. Description of Related Art Including Information Disclosed Under 37 CFR 1.97 and 37 CFR 1.98

Several designs for pet training harnesses have been designed in the past. None of them, however, includes a training harness that has a portion of the harness separable to convert the device into a single strap collar around the neck of the animal when not specifically training.

Applicant believes that the closest references correspond to commonly available pet harnesses that have a strap around the neck combined with a strap around the chest of the animal to be used for pet obedience training.

The present invention is advantageous because a single product can now be used both for training methods with the leash connection point above or below the neck and also as a traditional single strap around the neck for walking with a leash, all without having to purchase, maintain and carry a separate training harness and walking collar.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide a pet training harness with a convertible strap to be used as a single loop collar.

It is another object of the present invention to provide a training device that can be converted in the field and without tools.

It is still another object of the present invention to provide a training harness and walking collar that are fashionably coordinated in color, material and texture.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts as will be more fully understood from the following description, when read in conjunction with the accompanying drawings in which.

DETAILED DESCRIPTION OF THE INVENTION

Figure 1:
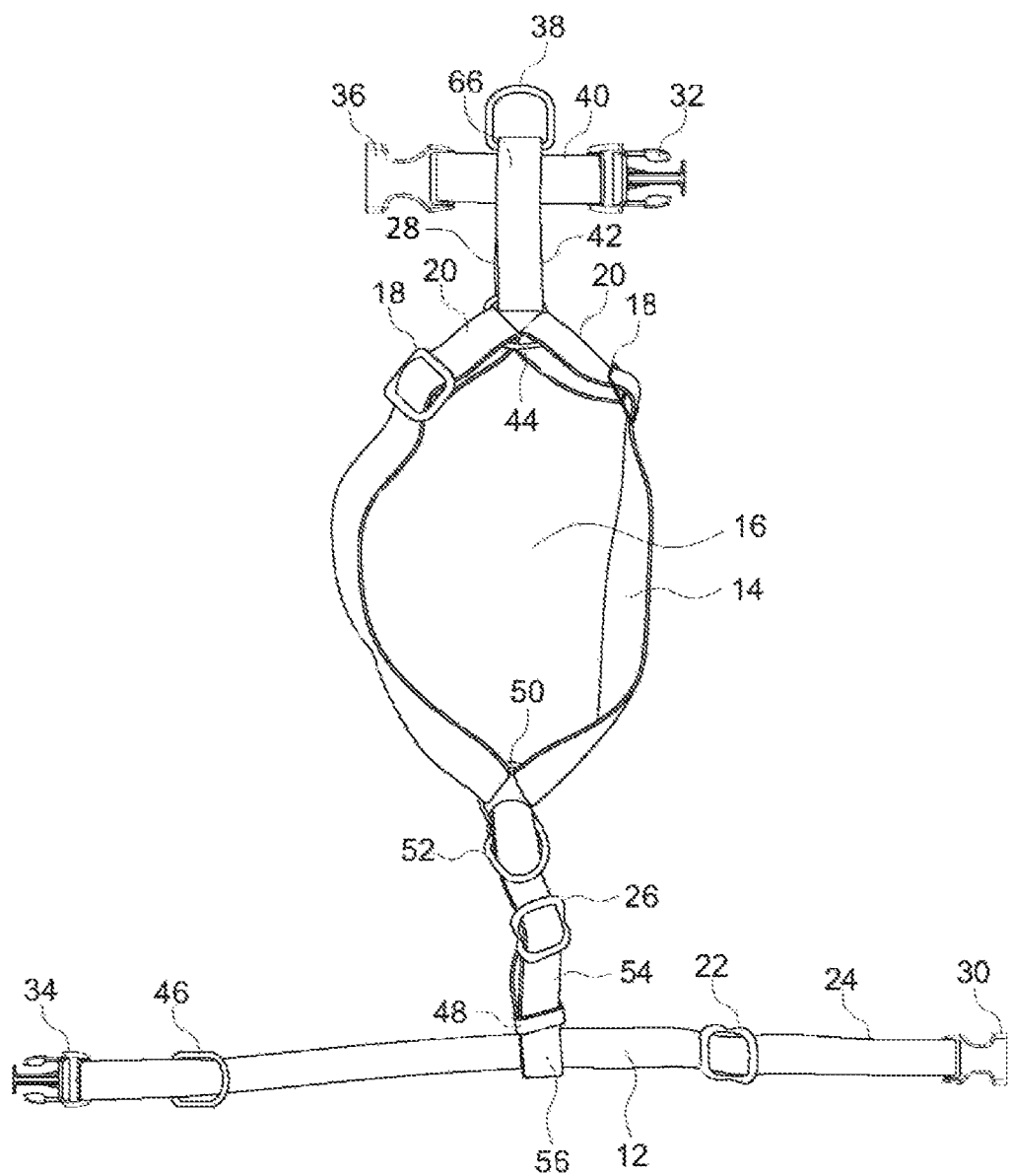
FIG. 1 shows a perspective view of the complete convertible harness and collar laid flat and not attached to an animal.

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the harness, the collar, the convertible pet harness or collar, the strap, the machine or other similar terms. These terms may be used interchangeably as context requires and from use the intent becomes apparent. The masculine can sometimes refer to the feminine and/or the neuter and vice versa. The plural may include the singular and singular the plural as appropriate from a fair and reasonable interpretation in the situation.

Referring now to the drawings, where the present invention is generally referred to with numeral 10, it can be observed that it basically includes a convertible strap 12, a neck strap 14, a neck loop 16, slides 18, loops 20, slides 22, loop 24, slide 26, loop 28, buckle 30, buckle 32, buckle 34, buckle 36, D-ring 38, back body intersection 40, upper connector 42, O-ring 44, D-ring 46, keeper 48, ring 50, D-ring 52, lower connector 54, loop 56, leash 58, clip 60, leash 62, clip 64 and loop 66.

Figure 2:
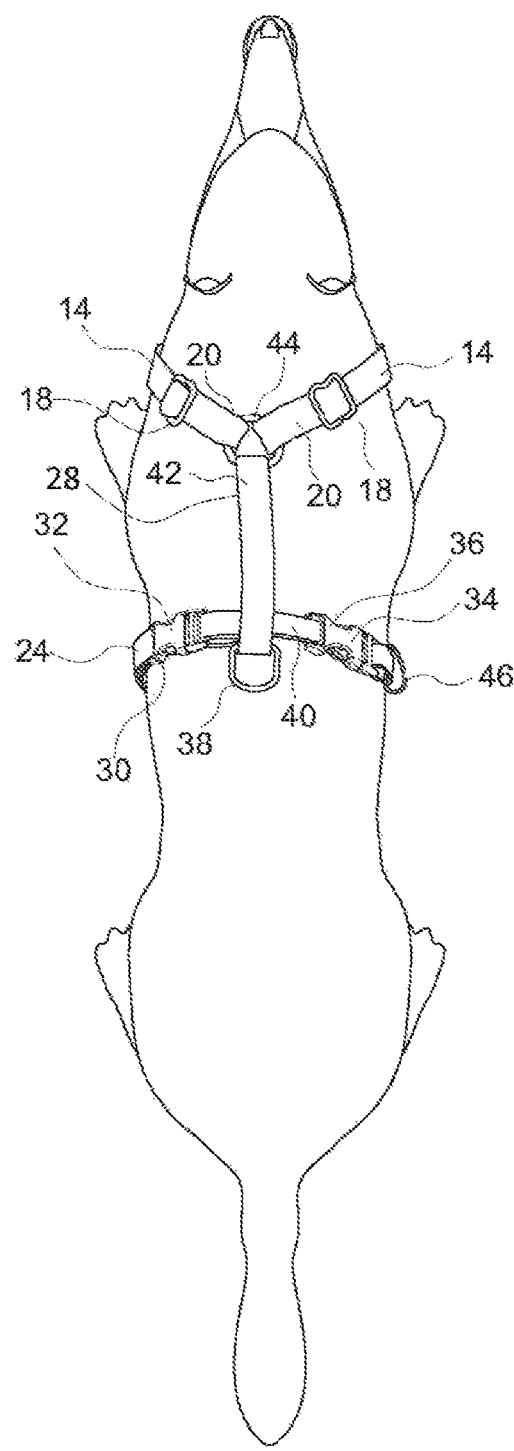
FIG. 2 shows a top plan view of the harness in a training mode on an animal.
Figure 3:
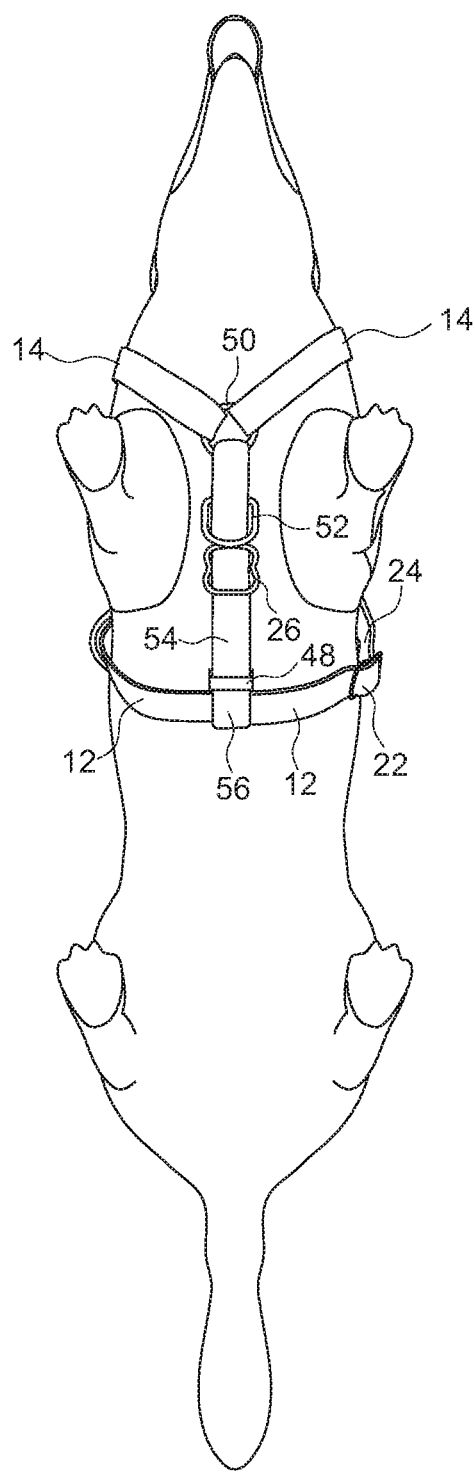
FIG. 3 shows a bottom plan view of the same configuration of the harness as shown in FIG. 2.

Looking now at FIG. 1 a complete convertible pet harness is shown spread out and separated from an animal. In this view all the parts of the device are readily visible. FIGS. 1-3, showing one version of the device, are to be read in combination for the following description of installing the convertible pet harness onto a pet in the harness mode.

The neck strap 14 is provided to place the neck loop 16 around the animal's neck in the harness mode. The upper connector 42 is placed on the dorsal side or back of the animal over the spine. The convertible strap is then placed around the chest of the animal distal to its front legs. The buckle 36 then engages the buckle 34 on the right side of the animal and the buckle 32 and buckle 30 engage together on the left back of the animal. In this way the convertible pet harness is easily and quickly attached to the animal. Harness mode is used generally for training.

Optionally, the neck strap 14 may include a buckle (not shown in the drawings, but similar to buckles 32 and 36 together) to allow the neck strap 14 to open and be placed around the animals neck without having to pull it down over the face of the animal. Some pets cannot tolerate straps being placed over their head. In this case the additional buckle in neck strap 14 will allow the handler to reach around the animal's neck to complete the neck loop 16 around the animal's neck.

Figure 4:
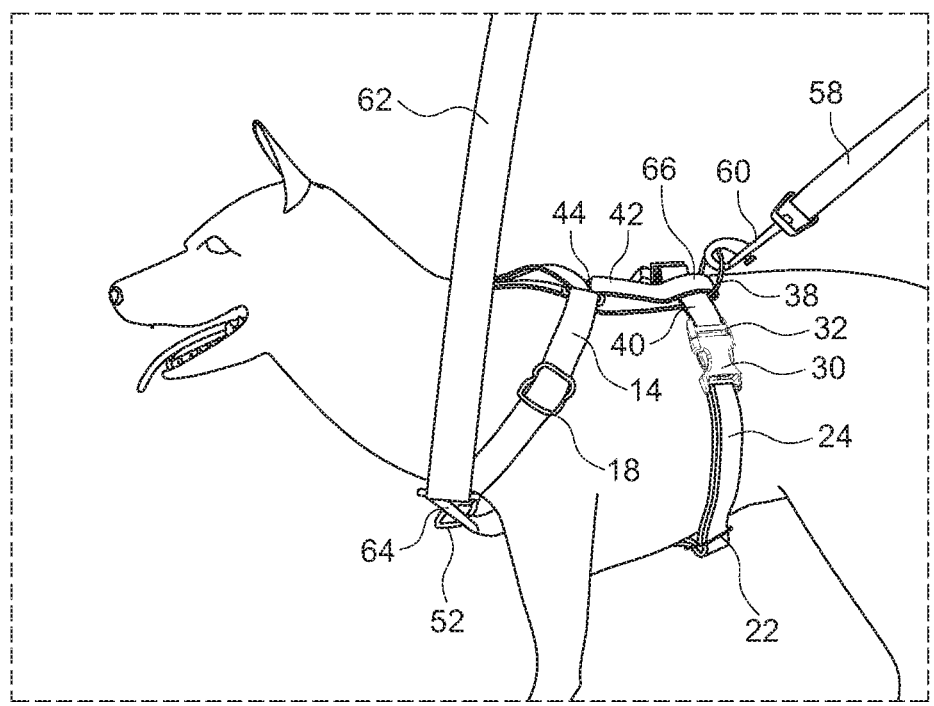
FIG. 4 shows a side perspective view of the harness connected to alternate leash positions. Only one leash position is used at a time.

In the typical training mode, there is a D-ring 38 held inside the loop 66 of the upper connector 42. The D-ring 38 is typically made of metal, but could also be another type of loop or strap adapted to affixed to a leash 58 with a clip 60, as shown in FIG. 4. Generally, this configuration is used when the animal is advanced in the obedience training. With the human handler holding the leash 58, the animal can be easily and painlessly restrained with a signaling tug on the leash 58.

FIG. 4 also shows the early training mode configuration where the leash 62 is attached to D-ring 52 with a clip 64. With the connection point of the clip 64 to the D-ring 52 below the neck of the animal the trainer can easily apply upward pressure to encourage the animal to lift its head to look at the trainer or avoid other distractions.

It should be noted that FIG. 4 shows both the leash 62 clipped to D-ring 52 as well as leash 58 attached to D-ring 38. In most situations either leash 58 or leash 62 would be used. Both leashes 58 and 62 are depicted together in 54 to emphasize the alternate positions. In fact, only one leash is used and can be reattached to either the ring 52 or the D-ring 38. Only one leash is needed to function with the convertible pet harness.

The leash itself is not particular to the claimed design. Generally, any commercially available at leash with a clip terminus to attach to a D-ring may be used. However, a color and material coordinated at leash may be provided with the complete convertible pet harness package to improve aesthetics.

The drawings depict a dog as the pet wearing the harness and being trained. However, it should be appreciated that the animal being trained could be generally any type of animal suitable for training by a human handler. It is anticipated that a primary use of the convertible pet harness will be used for dog obedience training. The term pet, dog, animal and other similar terms are all intended to be used interchangeably. Differences in terminology are used to emphasize that different types of animals could be trained with the device.

Looking again at FIG. 1, it can be observed that buckle 36 is female and engages the corresponding mail buckle 34 of the convertible strap 12 while mail buckle 32 on the back body intersection 40 connects to the female buckle 30 on the convertible strap when configured in harness mode. It should be appreciated that whether the male or female buckle is on the left or right is less consequential than having a buckle on the left side of the back body intersection 40 connects to a corresponding buckle on the convertible strap 12. Likewise, the right side buckle on the back body intersection 40 should also meet with the complementary buckle 30 on the convertible strap 12. This feature means that the convertible strap 12 will have both a male and a female type connector so that the convertible strap 12 may be used alone in collar mode.

Loop 28 is optionally provided on upper connector 42. The loop 28 may be used to attach accessories, such as a service animal tag, a vehicle seat belt connector, a light, a digital tag or other small device that can be clipped, clamped or adhered to the loop 28.

The lower connector 54 has a loop 56 at one end. The convertible strap 12 passes through the loop 56 when in the harness mode. The keeper 48 encircles the lower connector and retains the convertible strap 12 from excessive lateral sliding movement.

The keeper 48 may be slid away from the convertible strap 12 to enlarge the loop 56 thereby permitting the convertible strap 12 to be completely separated from the balance of the device including the lower connector 54, neck strap 14 and upper connector 42. With the convertible strap separated from the other elements of the design and all the other elements are removed from the animal, the convertible strap 12 may then perform as a traditional collar placed around the neck of the animal and used with or without a leash connected to D-ring 46.

Figure 5:
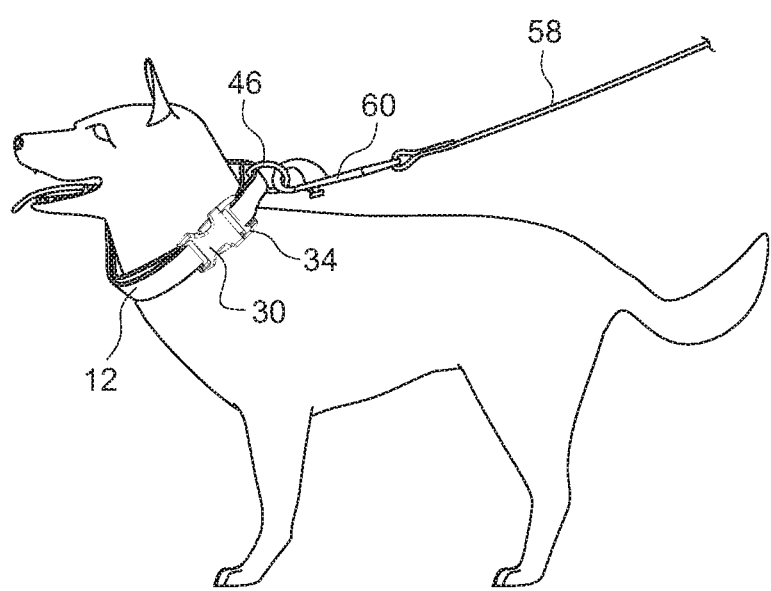
FIG. 5 shows a perspective view of the convertible pet harness in a collar mode.

In other words, the convertible strap 12 is located around the chest of the animal while the device is in harness mode, as shown in FIG. 4 (note only one leash is generally used at a time). When the convertible strap 12 is separated from the rest of the device it can be used alone as a traditional neck collar in collar mode, as shown in FIG. 5.

When acting as a neck collar alone, the convertible strap 12 includes a D-ring 46 that can be connected to a leash. The ring 46 is generally only used when the convertible strap 12 is used in the collar mode as shown in FIG. 5. Conversely, when in harness mode, as shown in FIG. 2, the only rear attachment point for the leash clip is the D-ring 38 on the upper rear side of the animal.

The convertible pet harness is adjustable to fit a wide range of animals. The slides 18 slide along the neck strap 14 and increase or decrease the size of the neck loop 16 by gathering some of the neck strap 14 material into the loops 20. Generally, to maintain symmetry of the device while worn on the animal in harness mode, the left and right slides 18 are positioned so that the loops 20 are approximately equal on both the left and right side of the animal.

The upper connector 42 is permanently connected on a first and to the O-ring 44. On the opposite, rear end of the upper connector 42, the loop 66 is permanently sewn into the back body intersection 40 where the D-ring 38 is also permanently captured. The buckle 36 and buckle 32 are also preferably permanently affixed to the respective ends of the back body intersection 40.

The O-ring 44 also attaches to the left and right sides of the neck strap 14 at the loops 20. The O-ring 44 may effectively if circular or triangular. Because the O-ring 44 connects to the upper connector 42 and both loops 20 a three sided triangular design for the O-ring 44 is suitable. Similarly, the ring 50 may be circular or triangular because it connects the strap forming the lower connector 54 to both ends of the neck strap 14.

The length of the lower connector 52 may also be adjusted by moving the slide 26 along the length of the strap comprising the lower connector 54. The keeper 48 also slides along the lower connector 54 to reduce the size of loop 56 to hold the lower connector in position approximately in the middle of the convertible strap 12.

When the user is converting the harness from harness mode to collar mode, the keeper 48 is slid away from the convertible strap 12 thereby increasing the size of the loop 56 and allowing the convertible strap 12 to be removed from the lower connector 54. Generally, the convertible strap 12 is only removed from the lower connector 54 when the buckles 30, 32, 34 and 36 are disconnected and the harness is removed from the animal.

Once the convertible strap 12 is separated from the balance of the device the lower connector 54, neck strap 14, upper connector 42 and back body intersection 40 can be stored for later use. The convertible strap 12 is then placed around the neck of the animal and complementary buckles 30 and 34 secure the convertible strap 12 around the animal's neck.

A slide 22 is provided on the convertible strap to reduce or enlarge the length of the convertible strap 12 so it can perform both its function around the neck with a shorter length of the convertible strap 12 and also perform as the strap behind the animals forelegs when in harness mode. A D-ring 46 is captured onto the convertible strap. The D-ring 46 is generally only used when the convertible strap 12 is operated in the collar mode, as demonstrated in FIG. 5.

An important version of the invention can be fairly described as a convertible pet harness comprised of, among other elements, a convertible strap 12, a lower connector 54, a neck strap 14, an upper connector 42 and a back body intersection 40. The next strap 14 forms a neck loop 16. The neck loop 16 has a circumference dimensioned to fit around the neck of a predetermined pet onto which the harness will be fitted. The upper connector 42 at a rear, first is a connected to both the D-ring 38 and the middle of the back body intersection 40. The back body intersection 40, comprised of a section of strap, has affixed on a first, right end buckle 36 and on a second, left end buckle 32. the neck loop 16 is connected to the forward, second end of the upper connector 42. On an opposite, diametrically opposed point on the neck loop 16, the first, forward end of the lower connector is a connected to the neck loop 16 so that the upper connector 42 and the lower connector 54 can lie generally along the midline of the pet. The ring 52 is affixed to the forward, first end of the lower connector 54. The rear, second end of the lower connector 54 includes a loop. The convertible strap 12 passes through the loop 56. The convertible strap 12 has a third buckle 34 at a first end and a fourth buckle 30 attached at the opposite, second end. The convertible pet harness is put into a harness mode when the neck loop 16 is placed over the neck of the pet forward of the front legs and the upper connector 42 is on the dorsal side of the pet (along the spine) and the lower connector 54 is on a ventral side of the pet (along the breastbone) and the convertible strap 12 encircles the pet distal or behind the front legs of the pet with the first buckle 36 connected to the third buckle 34 on the right side of the pet and the second buckle 32 connected to the fourth buckle 30 on the left side of the pet. In the harness mode a leash may be connected to either the first D-ring 38 or the second ring 52 for pet training or walking. The convertible pet harness may be transformed into a collar mode when the entirety of the convertible pet harness is removed from the pet and the convertible strap 12 is removed from within the loop 56. The convertible strap then may be placed around the neck of the pet and the third buckle 34 connected to the fourth buckle 30 forward of the pet's front legs. A leash may then be connected to the D-ring 46. Optionally, the convertible pet harness may include a keeper 48 that slides over the lower connector 54 to adjust the size of the loop 56 to loosen or tighten its hold under the convertible strap 12 inside the loop 56.

This keeper 48 is slid away from the convertible strap 12 to allow the convertible strap 12 to be removed from the loop 56 when converting into collar mode. Optionally, slide 22 may be provided to adjust the length of the convertible strap 12 to fit the animal either in harness mode or collar mode. Optionally one or two slides 18 may be provided in the next strap 14 to adjust the circumference of the neck loop 16. Optionally, slide 26 is provided in the lower connector 54 to adjust the length of the lower connector 54 for the harness mode.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A convertible pet harness comprised of convertible strap (12), a lower connector (54), a neck strap (14), an upper connector (42) and a back body intersection (40);

the neck strap (14) forms a neck loop (16);

the neck loop (16) has a circumference dimensioned to fit around a neck of a predetermined pet;

the upper connector (42) at a first end is affixed to both a first D-ring (38) and a middle of the back body intersection (40);

the back body intersection (40) has affixed on a first end a first buckle (36) and on a second end a second buckle (32);

the neck loop (16) at a first point is connected to a second end of the upper connector (42) and at a second point, diametrically opposed the first point, is connected to a first end of the lower connector (54) through an O-ring (50);

the first end of the lower connector is affixed to a second ring (52);

a second end of the lower connector (54) has a loop (56) through which passes the convertible strap (12);

the convertible strap (12) at a first end is affixed a third buckle (34) and at a second end is affixed a fourth buckle (30);

when in a harness mode the neck loop (16) is placed over a neck of a pet forward of a front legs of the pet and the upper connector (42) is on a dorsal side of the pet and the lower connector (54) is on a ventral side of the pet and the convertible strap (12) encircles the pet distal to the front legs of the pet with the first buckle (36) connected to the third buckle (34) and the second buckle (32) is connected to the fourth buckle (30) so that either the first D-ring (38) or the second ring (52) is connected to a leash;

when in a collar mode the entirety of the convertible pet harness is removed from the pet and the convertible strap (12) is removed from the loop (56) and the convertible strap (12) is placed around the neck of the pet forward of the front legs of the pet and the third buckle (34) is connected to the fourth buckle (30) and the third ring (46) is connected to the leash.

2. The convertible pet harness of claim 1 further characterized in that a keeper (48) slides on the lower connector (54) to increase or decrease the size of the loop (56) to respectively loosen or tighten the convertible strap (12) inside the loop (56).

3. The convertible pet harness of claim 1 further characterized in that a slide (22) is included on the convertible strap (12) to adjust a length of the convertible strap (12).

4. The convertible pet harness of claim 1 further characterized in that a slide (18) is included on the neck strap (14) to adjust the circumference of the neck loop (16).

5. The convertible pet harness of claim 1 further characterized in that a slide (26) is included on the lower connector (54) to adjust the length of the lower connector (54).

\* \* \* \* \*